2 Sheets—Sheet 2.

G. W. BARNETT.
Traction-Wheel.

No. 20,318.

Patented May 25, 1858.

UNITED STATES PATENT OFFICE.

G. W. BARNETT, OF SPRINGFIELD, OHIO.

DRIVING-WHEEL FOR PORTABLE STEAM-ENGINES AND AGRICULTURAL IMPLEMENTS.

Specification of Letters Patent No. 20,318, dated May 25, 1858.

*To all whom it may concern:*

Be it known that I, G. W. BARNETT, of Springfield, in the county of Clark and State of Ohio, have invented a new and useful Improvement in the Construction of Driving or Ground Wheels for Portable Steam-Engines, Agricultural Implements, &c., of which the following is a full, clear, and exact description, reference being had to the accompanying drawing, making part of this specification, in which—

Figure 1:
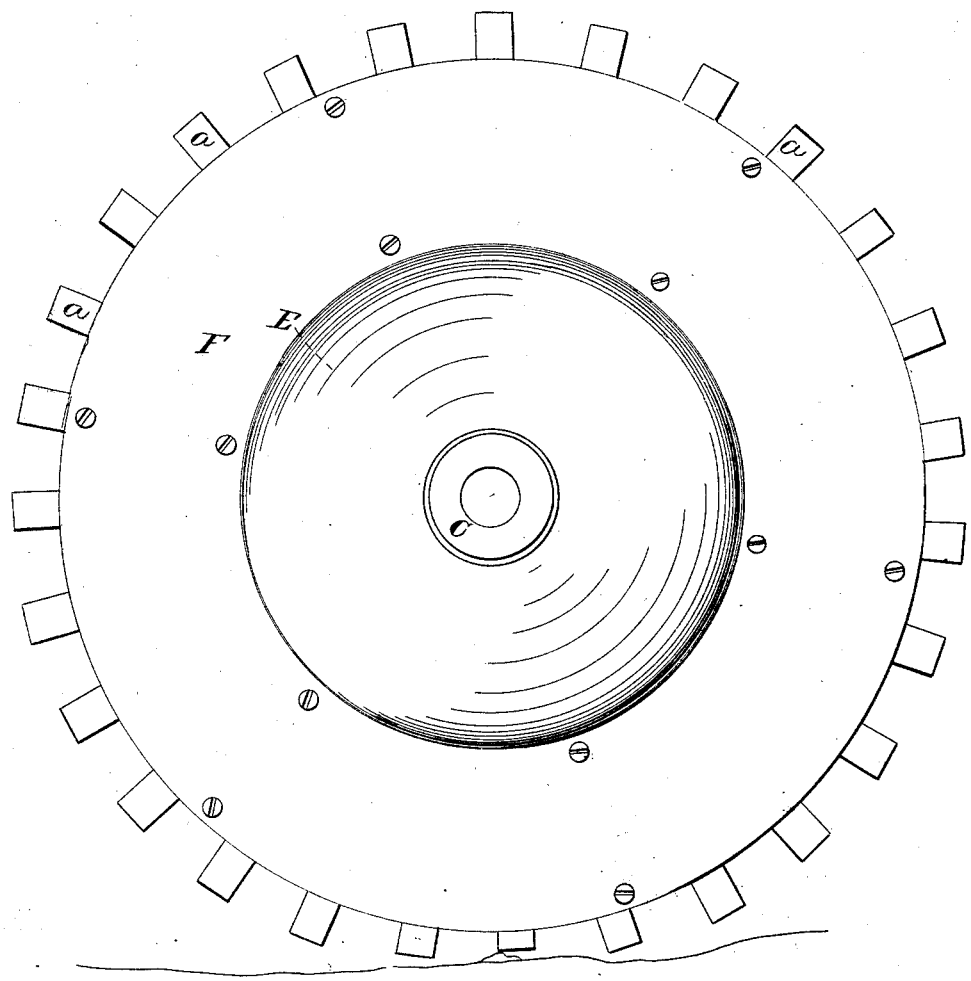
Figure 2:
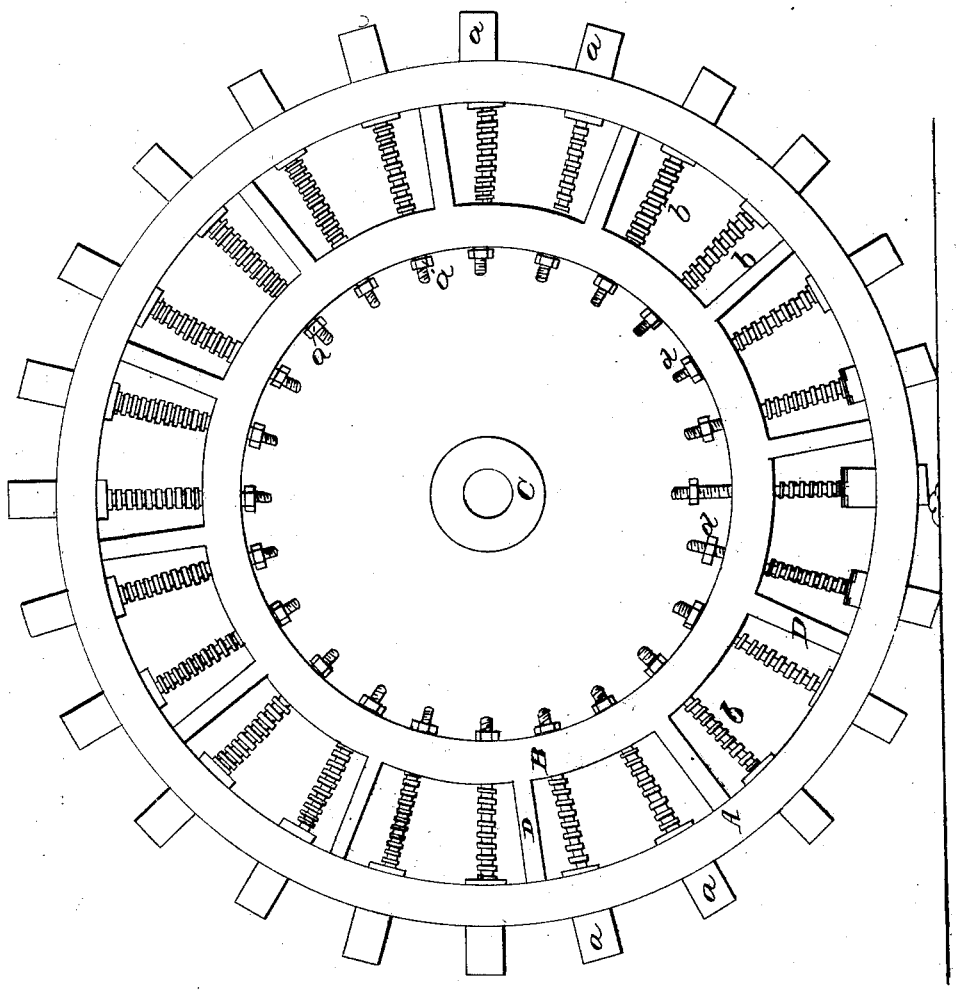

Figure 1, represents a side elevation of my improved wheel, detached from the machine, and Fig. 2, a similar view the upper plate or disk being removed.

My improvement relates to the construction of driving or ground wheels for portable steam engines, agricultural implements, &c.

Heretofore great difficulty has been experienced in the use of machines intended for field work, on account of the tendency of the driving wheels to slip, as the combined advance rolling friction of the wheels and friction of attrition of the axles, together with the resistance of the gearing parts is often greater than the dragging friction of the machine. By increasing the whole weight so as to increase the dragging friction, the greater weight of the machine would cause the wheels to sink deeply in soft ground, which might prevent completely its further progress or at least necessitate a great additional amount of power for its operation. Many plans have been heretofore devised to increase the dragging resistance without increasing the weight of the machine, as for instance by making the outer periphery or tread of the wheel corrugated, &c.; but such an arrangement presents many disadvantages, as for instance when working for some time on stiff ground, the grooves of the corrugated wheels get filled and clogged up with earth and hence do not present much more resistance than if they were made perfectly smooth and even. Again in none of these wheels has suitable means ever been provided for overriding in an effectual manner stones or other obstacles without jarring the machine, and as these frequently present themselves in the path of the wheels they greatly impede the progress of the machine and cause it to wrench and jerk to the great damage of its strength and durability. Similar objections to the use of portable steam engines hold good, whether intended for field purposes or for mere transportation, where they have to be carried over rough and stony ground and roads, as under the old modes of constructing the wheels, they are constantly subject to jerks or wrenches, which is exceedingly detrimental to them.

To remedy all of which is the object of my invention and it consists in providing the periphery or tread of the wheels with one or more series of radial feet, in such manner that they will gradually yield by compression as the wheel advances and again project as the resistance is removed. By such an arrangement a sufficient hold on the ground will be given to the wheels to prevent their slipping; and stones or other obstacles will be surmounted in an easy manner without causing the machine to jerk.

To enable others skilled in the art to make construct and use my invention I will now proceed to describe it in detail.

In constructing these wheels they may be made of any kind of material that builders may deem most suitable for the purpose, as for example they may be made of wood, cast or wrought iron, or a combination of all three or of any two of them. In this instance the wheel is represented as being formed of two concentric rings (A and B) and the hub (C) the two forms being connected by means of arms (D) and the inner ring (B) and the hub (C) by curved disks (E) the hub being formed in one piece with one of the disks, although not necessarily so; on either side of the wheels for the purpose of covering in the entire sides of the wheel, an annular disk or plate of metal (F) is firmly bolted to the curved disk (E) and the inner and outer rims or rings (A and B). Through these rings mortises are cut into which one or more series of radial slides (*a*) are fitted; these slides on their outer end being in this instance of rectangular form and their rear end cylindrical. On the cylindrical end between the rings (A and B) is arranged a coiled spring (*b*) having its bearings at one end against a disk (*c*) similarly mounted on the inner end of the slide, and its other end against the outer periphery of the inner ring (B). On the end of the slide that passes through the inner ring is cut a screw thread, by means of which and a nut (*d*) the slides are retained in their proper position, and by which the degree of elasticity, and extent of projection of the slides, through the periphery or tread of the wheel, can be regulated at pleasure. On the outer end of these slides broad flat shoes may or may not be secured according as circumstances may dictate; as broad feet on soft ground would be absolutely necessary whereas on hard ground there would be no object in their use.

Having thus described my invention what I claim as new and desire to secure by Letters Patent is—

Providing a wheel with one or more series of radial elastic feet in the manner and for the purposes substantially as set forth.

In testimony whereof I hereunto subscribe my name.

G. W. BARNETT.

Witnesses:
W. LESKI,
P. HANNAY.